United States Patent Office 3,362,958
Patented Jan. 9, 1968

3,362,958
4-[PYRAZOLYL-(1)]-NAPHTHALIMIDES
Carl-Wolfgang Schellhammer, Opladen, and Annemarie Wagner, Leverkusen, Germany, assignors to Farbenfabriken Bayer Aktiengesellschaft, Leverkusen, Germany, a corporation of Germany
No Drawing. Filed July 19, 1965, Ser. No. 473,217
Claims priority, application Germany, Aug. 8, 1964,
F 43,706
3 Claims. (Cl. 260—281)

The present invention relates to brightening agents; more particularly it concerns brightening agents containing as active component blue-fluorescent 4-[pyrazolyl-(1)]-naphthalimides of the formula

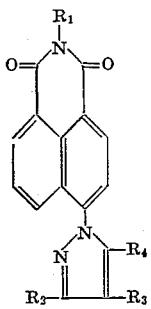

wherein $R_1$ stands for hydrogen, a saturated or unsaturated aliphatic hydrocarbon radical with 1 to 4 carbon atoms such as lower alkyl radicals or an araliphatic hydrocarbon radical such as phenyl lower alkyl, which hydrocarbon radicals may be substituted, for example by optionally esterified or etherified hydroxyl groups, amino groups, nitrilo groups, acyl groups, carbalkoxy groups or pyrrolidonyl groups, and wherein $R_2$ to $R_4$, independently of one another, denote hydrogen or an aliphatic hydrocarbon radical containing 1 to 4 carbon atoms.

Of particular interest are those compounds in which $R_1$ is defined as H, lower alkyl, lower alkene, phenyl lower alkyl, hydroxy lower alkyl, lower alkoxy lower alkyl, cyano lower alkyl, di-lower alkyl carbonyl, lower alkyl carboxy lower alky, N,N- di-lower alkyl amino.

The lower aliphatic radical of $R_2$ and $R_4$ is inclusive of lower alkyl containing 1–4 carbon atoms.

In the following table a number of relevant compounds are listed by way of example.

The brightening agents of the present invention are mainly suitable for brightening synthetic materials, e.g. for the brightening of fibres, filaments, fabrics, foils or plastic masses made of polyamides, polyacrylonitrile, polyesters, polyvinyl chloride and cellulose acetate, and also for brightening lacquers of cellulose acetate. The brightening agents can be applied in usual manner, for example, in the form of aqueous dispersions or of solutions in organic solvents, such as ethyl acetate and toluene. If desired, the brightening agents can also be applied in combination with detergents or they can be added to casting masses serving for the production of foils or filaments. The necessary amounts can easily be determined for each case by preliminary experiments; in general, quantities of 0.1–0.5%, referred to the material to be brightened, have proved to be sufficient.

In comparison with 4-acylamino-naphthalimides and 4-alkoxy-naphthalimides already known as brightening agents, the brightening agents of the present invention are distinguished by a surprisingly higher fastness to light.

TABLE

| $R_1$ | $R_2$ | $R_3$ | $R_4$ | M.P., °C. |
|---|---|---|---|---|
| H | $CH_3$ | H | H | 302 |
| $CH_3$ | H | H | H | 220 |
| $CH_3$ | $CH_3$ | H | H | 207 |
| $CH_3$ | $CH_3$ | H | $CH_3$ | 202 |
| $C_2H_5$ | H | H | H | 166 |
| $C_2H_5$ | $CH_3$ | H | H | 185 |
| $C_2H_5$ | $CH_3$ | H | $CH_3$ | 178 |
| $C_3H_7$ | H | H | H | 170 |
| $C_3H_7$ | $CH_3$ | H | H | 179 |
| $C_3H_7$ | $CH_3$ | H | $CH_3$ | 153 |
| $i$-$C_3H_7$ | H | H | H | 144 |
| $i$-$C_3H_7$ | $CH_3$ | H | H | 157 |
| $i$-$C_3H_7$ | $CH_3$ | H | $CH_3$ | 140 |
| $n$-$C_4H_9$ | H | H | H | 132 |
| $n$-$C_4H_9$ | $CH_3$ | H | H | 145 |
| $n$-$C_4H_9$ | $CH_3$ | H | $CH_3$ | 137 |
| $-CH_2-CH(CH_3)_2$ | H | H | H | 173 |
| $-CH_2-CH(CH_3)_2$ | $CH_3$ | H | H | 159 |
| $-CH_2-CH(CH_3)_2$ | $CH_3$ | H | $CH_3$ | 135 |
| $CH_2-CH=CH_2$ | $CH_3$ | H | H | 160 |
| $CH_2-C_6H_5$ | $CH_3$ | H | H | 165 |
| $C_2H_4OH$ | $CH_3$ | H | H | 196 |
| $CH_2-CH_2-O-CO-CH_3$ | $CH_3$ | H | H | 171 |
| $CH_2-CH_2-O-CO-C_2H_5$ | $CH_3$ | H | H | 128 |
| $CH_2-CH_2-O-CO-C_3H_7(n)$ | $CH_3$ | H | H | 120 |
| $CH_2-CH_2-O-CO-NH-C_2H_5$ | $CH_3$ | H | H | 133 |
| $CH_2-CH_2-CH_2-OCH_3$ | $CH_3$ | H | H | 132 |
| $CH_2-CH_2-CH_2-O-C_4H_9(n)$ | $CH_3$ | H | H | 111 |
| $CH_2-CN$ | $CH_3$ | H | H | 153 |
| $CH_2-CO-CH_3$ | $CH_3$ | H | H | 223 |
| $CH_2-COOC_2H_5$ | $CH_3$ | H | H | 176 |
| 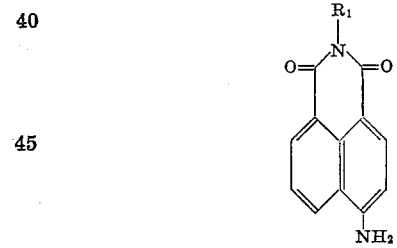 | $CH_3$ | H | H | 153 |
| $-(CH_2)_3-N\begin{smallmatrix}CH_3\\CH_3\end{smallmatrix}$ | $CH_3$ | H | H | 78 |

The brightening agents to be used according to the invention are obtainable, for example, in that 4-amino-naphthalimides of the formula $$\text{(structure with } R_1 \text{ on N, and } NH_2 \text{ on naphthalimide)}$$

in which $R_1$ has the meaning stated above, are converted by diazotisation and reduction of the diazonium salt formed, into the corresponding 4-hydrazino-naphthalimides and these then reacted with appropriate β-dicarbonyl compounds, e.g. with malonic dialdehyde, 3-ketobutyraldehyde or acetylacetone, expediently at temperatures of about 100° C. and in organic solvents which are free from keto groups; the aldehydes are advantageously used in the form of their acetals with the addition of small amounts of acid.

The following examples serve to illustrate the invention without, however, limiting its scope.

*Example 1*

A fabric made of polyester fibres is introduced in a liquor ratio of 1:40 into a bath containing, per litre, 1.5 g. oleyl sulphonate, 0.75 g. formic acid, and 0.1 g. N-methyl-4-[3-methyl-pyrazolyl-(1)]-naphthalimide; the bath is then heated to boiling temperature within 30 minutes and kept at boiling temperature for about 45 minutes, while the fabric is moderately moved about in the bath. The fabric is subsequently rinsed and dried. The fabric thus treated is then excellently and neutrally brightened.

The N-methyl-4-[3-methyl-pyrazolyl-(1)]-naphthalimide employed is prepared as follows:

22.6 grams N-methyl-4-amino-naphthalimide are diazotised in 150 cc. glacial acetic acid and 300 cc. concentrated hydrochloric acid at a temperature below 10° C. with 70 cc. of a 10% sodium nitrite solution, and the clear diazonium salt solution is then added at 0° C. to a solution of 52 g. tin (II) chloride in 105 cc. concentrated hydrochloric acid. The precipitated N-methyl-4-hydrazino-naphthalimide hydrochloride is filtered off with suction, suspended in water and converted into the free base by the addition of alkali. 19.5 grams of the N-methyl-4-hydrazino-naphthalimide thus obtained (decomposition point 283° C.) and 13 g. 3-keto-butyraldehyde-dimethyl acetal are then heated in 500 cc. methyl glycol at 100° C. for 3 hours; the reaction mixture is treated with 5 cc. concentrated hydrochloric acid and heated at 100° C. for another hour. Part of the solvent is then distilled off and the precipitated N-methyl-4-[3-methyl-pyrazolyl-(1)]-naphthalimide filtered off; after recrystallisation from alcohol, it has a melting point of 207° C.

*Example 2*

A fabric made of polyacrylonitrile fibres is introduced in a liquor ratio of 1:40 at 30° C. into an aqueous bath containing, per litre, 1 g. oleyl sulphonate, 0.75 g. formic acid, and 0.075 g. N-methyl-4-[3-methyl-pyrazolyl-(1)]-naphthalimide. The bath is heated to 90–95° C. and kept at this temperature for 45 minutes, while the fabric is moderately moved about in the bath. The fabric is then rinsed and dired. The fabric thus treated exhibits a very fine neutral brightening effect.

*Example 3*

A fabric made of cellulose acetate fibres is moved about in the aqueous bath described in Example 2 in a liquor ratio of 1:40 at 60° C. for 45 minutes, and then rinsed and dried. After this treatment, the textile material is excellently brightened.

Instead of the N-methyl-4-[3-methyl-pyrazolyl-(1)]-naphthalimide used in these examples, one of the other compounds listed in the table may also be used, for example N-methyl-4-[pyrazolyl-(1)]-naphthalimide or N-methyl - 4 - [3,3-dimethylpyrazolyl - (1)]-naphthalimide; these compounds can be obtained according to the method described in Example 1 when malonic dialdehyde-tetraethyl acetal or acetyl-acetone are used, instead of 3-keto-butylraldehyde-dimethyl acetate.

*Example 4*

65 g. of polyvinyl chloride having a K-value of about 72–74, 35 g. of dioctyl phthalate, 2 g. of a commercial organic tin compound serving as a stabilizer for the polyvinyl chloride, 1 g. of titanium dioxide rutile and 0.1 g. of the 4-[3-methyl-pyrazolyl-(1)]-naphthalimide of the formula

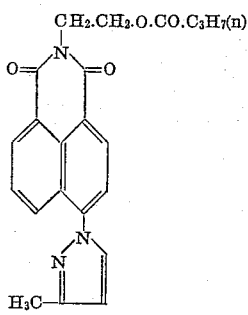

as brightening agents are rolled for 5 minutes on a roller heated to about 165–170° C. The sheet obtained is drawn off on a four-roller calender to a foil of a thickness of about 300/μ. The foil is excellently brightened, and the brightennig effect has an outstanding fastness to light.

The brightening agent appiled is prepared by esterifying N - β - hydroxyethyl - 4 - [3-methyl-pyrazolyl-(1)]-naphthalimide with butyric acid anhydride.

We claim:
1. A compound of the formula

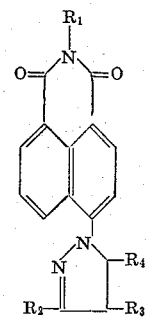

wherein $R_1$ is a member selected from the group consisting of hydrogen, lower alkyl, lower alkene, phenyl lower alkyl, hydroxy lower alkyl, lower alkoxy lower alkyl, lower alkoxy carbonyl, N-lower alkyl amino, lower alkoxy lower alkyl, cyano lower alkyl, di-lower alkyl carbonyl, lower alkyl carboxy lower alkyl, N,N'-dilower alkyl amino and

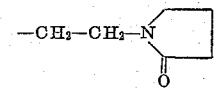

and $R_2$ and $R_4$ are independently defined as hydrogen or lower alkyl of 1–4 carbon atoms, and $R_3$ is hydrogen.

2. The compound of claim 1 wherein $R_1$ is hydrogen or lower alkyl; $R_2$ is hydrogen or methyl; and $R_4$ is hydrogen or methyl.

3. The compound of claim 1 wherein $R_1$ is lower alkene, hydroxy lower alkyl, phenyl lower alkyl or cyano lower alkyl; $R_2$ is hydrogen or methyl and $R_4$ is hydrogen or methyl.

References Cited

UNITED STATES PATENTS

| | | | |
|---|---|---|---|
| 3,310,564 | 3/1967 | Kasai | 260—281 |
| 2,715,126 | 8/1955 | Mulvaney et al. | 260—281 |
| 2,961,438 | 11/1960 | Fuchs et al. | 260—281 XR |
| 3,096,333 | 7/1963 | Wilson | 260—281 |
| 3,252,990 | 5/1966 | Green | 260—310 |

ALEX MAZEL, *Primary Examiner.*

D. DAUS, *Assistant Examiner.*